US010214232B2

(12) United States Patent
Sakaguchi et al.

(10) Patent No.: US 10,214,232 B2
(45) Date of Patent: *Feb. 26, 2019

(54) ELECTRIC POWER STEERING APPARATUS

(71) Applicant: NSK Ltd., Tokyo (JP)

(72) Inventors: Toru Sakaguchi, Maebashi (JP); Shoya Maruyama, Maebashi (JP)

(73) Assignee: NSK LTD., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 15/031,883

(22) PCT Filed: Jun. 4, 2015

(86) PCT No.: PCT/JP2015/066239
§ 371 (c)(1),
(2) Date: Apr. 25, 2016

(87) PCT Pub. No.: WO2015/198830
PCT Pub. Date: Dec. 30, 2015

(65) Prior Publication Data
US 2017/0106898 A1 Apr. 20, 2017

(30) Foreign Application Priority Data
Jun. 25, 2014 (JP) .................................. 2014-130175
Nov. 4, 2014 (JP) .................................. 2014-224341

(51) Int. Cl.
B62D 5/04 (2006.01)
B62D 15/02 (2006.01)
B62D 6/02 (2006.01)
B62D 6/10 (2006.01)
B62D 6/04 (2006.01)

(52) U.S. Cl.
CPC ............. *B62D 5/0463* (2013.01); *B62D 6/02* (2013.01); *B62D 6/04* (2013.01); *B62D 6/10* (2013.01); *B62D 15/0215* (2013.01)

(58) Field of Classification Search
CPC ........... B62D 5/0453; B62D 6/02; B62D 6/10
See application file for complete search history.

(56) References Cited

U.S. PATENT DOCUMENTS 9,796,412 B2 * 10/2017 Sakaguchi ........... B62D 5/0463
2017/0096163 A1 * 4/2017 Sakaguchi ........... B62D 5/0463

FOREIGN PATENT DOCUMENTS

JP 2007-022169 A 2/2007
JP 2007-331622 A 12/2007
(Continued)

OTHER PUBLICATIONS

International Search Report for PCT/JP2015/066239 dated Aug. 11, 2015 [PCT/ISA/210].
(Continued)

*Primary Examiner* — Jerrah Edwards
(74) *Attorney, Agent, or Firm* — Sughrue Mion, PLLC

(57) ABSTRACT

A safe electric power steering apparatus with a good steering feeling is provided that includes a function for getting out from restraint of a lateral flow or a one-sided flow, and enables acquisition of a better effect that a driver's load is reduced in the lateral flow or the one-sided flow. The safe electric power steering apparatus corrects a current command value by a motor current correction value based on a motor correction signal.

20 Claims, 10 Drawing Sheets

(56) References Cited

FOREIGN PATENT DOCUMENTS

| | | |
|---|---|---|
| JP | 2008-126891 A | 6/2008 |
| JP | 2008-207775 A | 9/2008 |
| JP | 2011-161942 A | 8/2011 |
| JP | 2012-116430 A | 6/2012 |
| JP | 5251898 B2 | 7/2013 |

OTHER PUBLICATIONS

Written Opinion for PCT/JP2015/066239 dated Aug. 11, 2015 [PCT/ISA/237].
International Preliminary Report on Patentability for PCT/JP2015/066239 dated Dec. 25, 2015 [PCT/ISA/409 & PCT/ISA/416].

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2015/066239 filed Jun. 4, 2015, claiming priority based on Japanese Patent Application Nos. 2014-130175 filed Jun. 25, 2014 and 2014-224341 filed Nov. 4, 2014, the contents of all of which are incorporated herein by reference in their entirety.

TECHNICAL FIELD

The present invention relates to an electric power steering apparatus that provides a steering mechanism of a vehicle with an assist torque by means of a motor in accordance with a current command value that is calculated based on at least a steering torque, and in particular to a safe electric power steering apparatus with a good steering feeling that has a function for restraining a lateral flow or a one-sided flow by means of a motor current correction value, moreover includes a function for getting out from the restraint of the lateral flow or the one-sided flow, and enables acquisition of a better effect that a driver's load is reduced in the lateral flow or the one-sided flow.

BACKGROUND ART

An electric power steering apparatus (EPS) which provides a steering mechanism of a vehicle with a steering assist torque by means of a rotational torque of a motor, applies a driving force of the motor that is controlled by electric power supplied from an inverter as the steering assist torque to a steering shaft or a rack shaft by means of a transmission mechanism such as gears. In order to accurately generate the steering assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control on the basis of a steering torque Th detected by the torque sensor 10 and a vehicle speed V detected by a vehicle speed sensor 12, and controls a current supplied to the motor 20 for the EPS on the basis of a voltage control command value Vref obtained by performing compensation or the like with respect to the current command value.

Moreover, the steering angle sensor 14 is not essential, it does not need to be provided, and it is possible to obtain the steering angle from a rotation sensor such as a resolver connected to the motor 20. It is possible to provide an auto-cruise switch 15, and input an auto-cruise signal AS.

A controller area network (CAN) 50 exchanging various information of a vehicle is connected to the control unit 30, and it is possible to receive the vehicle speed V from the CAN 50. Further, it is also possible to connect a non-CAN 51 exchanging a communication, analog/digital signals, a radio wave or the like except with the CAN to the control unit 30.

The control unit 30 mainly comprises a CPU (also including an MPU, an MCU or the like), and general functions performed by programs within the CPU are shown in FIG. 2.

The control unit 30 will be described with reference to FIG. 2. As shown in FIG. 2, the steering torque Th detected by the torque sensor 10 and the vehicle speed V detected by the vehicle speed sensor 12 (or sent from the CAN 50) are inputted into a current command value calculating section 31 for calculating a current command value Iref1. The current command value calculating section 31 calculates the current command value Iref1 that is a control target value of a current supplied to the motor 20 on the basis of the inputted steering torque Th and the inputted vehicle speed V and by using an assist map or the like. The current command value Iref1 is inputted into a current limiting section 33 through an adding section 32A. A current command value Irefm of which a maximum current is limited is inputted into a subtracting section 32B, and a deviation I (Irefm−Im) between the current command value Irefm and a motor current value Im is calculated. The deviation I is inputted into a PI control section 35 for characteristic improvement of steering operations. The voltage control command value Vref of which the characteristic is improved by the PI control section 35 is inputted into a PWM control section 36. Furthermore, the motor 20 is PWM-driven through an inverter circuit 37. The current value Im of the motor 20 is detected by a motor current detector 38 and is fed back to the subtracting section 32B. The inverter circuit 37 is comprised of a bridge circuit of FETs which are used as driving elements.

Further, a compensation signal CM from a compensation signal generating section 34 is added in the adding section 32A, and characteristic compensation of the steering system is performed by the addition of the compensation signal CM so as to improve a convergence, an inertia characteristic or the like. The compensation signal generating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

In such the electric power steering apparatus, a paved surface of a roadway is sloped about 1-2% from a center line to a road shoulder for the purpose of drainage or the like, so that a vehicle tends to be flowed in the direction of the road shoulder, which is a lateral flow or a one-sided flow, if a steering wheel is not kept turned for a long time in the case of running on a straight road fast. Further, wheel alignment breaks because of aging of the vehicle (for example, settling of a suspension bush and aging of a vehicle body), collision to a curbstone or the like, so that the vehicle may not run straight, which is the lateral flow or the one-sided flow, if a driver does not give power to a steering wheel. Such running may impose a large burden to the driver.

Therefore, many improvement methods have been conventionally proposed. For example, a method shown in Japanese Published Unexamined Patent Application No. 2007-22169 A (Patent Document 1) estimates a slope of a road surface in accordance with a vehicle speed, a lateral acceleration (a lateral G), a steering state and information of a navigation system, and corrects a lateral flow or a one-sided flow of a vehicle. A method shown in Japanese Published Unexamined Patent Application No. 2008-207775 A (Patent Document 2) calculates a smoothed torque Ts1 by smoothing a short-term steering torque in straight running, calculates a smoothed torque Ts2 by smoothing a long-term steering torque, judges running on a cant (a slope of a road surface) by the relation between the smoothed torque Ts1 and the smoothed torque Ts2, and corrects a lateral flow or a one-sided flow of a vehicle.

THE LIST OF PRIOR ART DOCUMENTS

Patent Documents

Patent Document 1: Japanese Published Unexamined Patent Application No. 2007-22169 A
Patent Document 2: Japanese Published Unexamined Patent Application No. 2008-207775 A
Patent Document 3: Japanese Patent No. 5251898 B2

SUMMARY OF THE INVENTION

Problems to be Solved by the Invention

However, the above methods shown in Patent Document 1 and Patent Document 2 can correct the lateral flow or the one-sided flow caused by the slope of the road surface (the cant), but have a problem that they cannot correct the lateral flow or the one-sided flow caused by changing wheel alignment because of aging of the vehicle or the like. Further, the method described in Patent Document 1 needs apparatuses such as the navigation system and a lateral acceleration sensor and processing of signals from sensors, so that costs increase, and some vehicles cannot be corrected in accordance with state of the vehicle equipment. The method described in Patent Document 2 is based on the premise that the vehicle runs on the cant after running on a smooth road surface, so that it may be unable to correct the lateral flow or the one-sided flow when the vehicle runs on the cant from the beginning.

There is an electric power steering apparatus disclosed in the publication of Japanese Patent No. 5251898 B2 (Patent Document 3) as an art to solve such a problem. The apparatus disclosed in Patent Document 3 provides an action force detecting means that detects action force (a SAT, a steering torque, reaction force of a column shaft or the like) added to a steering mechanism, a rotation angle detecting means that detects a rotation angle (a steering angle) of the steering mechanism, and a motor current correction value calculating section that judges a running state of a vehicle on the basis of the action force, the rotation angle and a vehicle speed, calculates a motor current correction value on the basis of the result from judging the running state and the action force, and corrects a current command value by the calculated motor current correction value, then drives and controls a motor in accordance with the current command value corrected by the motor current correction value.

FIG. 3 shows an outline configuration of the apparatus (the motor current correction value calculating section 100A) disclosed in Patent Document 3. A steering angle θ, a SAT estimation value and a vehicle speed V are inputted into a straight running judging section 110, at the same time, the steering angle θ is inputted into a reset table 130, the SAT estimation value is inputted into a gain section 101 and the reset table 130, and the vehicle speed V is inputted into a vehicle speed sensitive gain section 133. The straight running judging section 110 judges whether a vehicle runs straightly, and outputs a judgment signal SD. The judgment of straight running by the straight running judging section 110 is as follows: the judgment of straight running is established (SD=1) when the steering angle θ is within a predetermined range, the vehicle speed V is larger than or equal to a predetermined value, and an absolute value of the SAT estimation value is smaller than or equal to a predetermined value, and otherwise it is not established (SD=0). The gain section 101 multiplies the SAT estimation value by a gain G, and the multiplication result is inputted into a contact 102a in a switching section 102. The reset table 130 outputs a reset gain RG corresponding to the SAT estimation value and the steering angle θ. The reset gain RG is inputted into a multiplying section 132 through a sign inverting section 131.

The judgment signal SD (established=1, not established=0) from the straight running judging section 110 is inputted into a straight running time judging section 120. The straight running time judging section 120 comprises a counting section 121 for counting the judgment signal SD, a limiter 122 having a lower limit (=0) and an upper limit (=500), and a condition judging section 123 that outputs a straight running judgment result SR (=1) when a count value is larger than or equal to 200 (straight running), and outputs the straight running judgment result SR (=0) when the count value is smaller than 200 (not straight running). The straight running judgment result SR switches the contact 102a and a contact 102b in the switching section 102, switches to the contact 102a when the straight running judgment result SR=1, and switches to the contact 102b when the straight running judgment result SR=0. A signal SG1 gotten by multiplying the SAT estimation value by the gain G has been inputted into the contact 102a, and a multiplication result SG2 from the multiplying section 132 has been inputted into the contact 102b.

The contact 102a and 102b in the switching section 102 are switched by the straight running judgment result SR. A steering state signal SG3 outputted from the switching section 102 is inputted into an adding section 103. An addition value gotten by adding the steering state signal SG3 and a signal from a memory unit 107 for storing a signal sampled before the last one is inputted into a multiplying section 105 as a motor correction signal SG4 through a limiter 104, and, at the same time, is inputted into the memory unit 107. A vehicle speed gain Ga from the vehicle speed sensitive gain section 133 is inputted into the multiplying section 105. A multiplication result SG5 gotten by multiplying the vehicle speed gain Ga and the motor correction signal SG4 is outputted as a motor current correction value Imca through a limiter 106. A current command value is corrected by the motor current correction value Imca.

In this way, the electric power steering apparatus described in Patent Document 3 calculates the motor current correction value Imca by the action force detecting means, the rotation angle detecting means and the motor current correction value calculating section 100A, so that it can correct a lateral flow or a one-sided flow caused by a slope of a road surface and/or change of wheel alignment, moreover, it can accurately detect and correct the lateral flow or the one-sided flow of the vehicle in any case, and it is possible to provide the electric power steering apparatus that enables safer and comfortable straight running.

However, it is necessary to make a threshold range (uth-dth) for judging straight running large (for example) ±12° in order to make the restraint of the lateral flow or the one-sided flow described in Patent Document 3 function effectively. What matters here is as follows. When a driver steers a steering wheel deliberately between the upper straight running judgment threshold uth and the lower straight running judgment threshold dth as shown in FIG. 4B, the motor correction signal shown in FIG. 4A is not reset, that is, the correction amount cannot be released, in some cases, there is a possibility that an assist torque remains in the opposite direction against a driver's intension, so that the apparatus limits the correction amount so as not to give the driver uncomfortable feeling. The effect that a driver's load is reduced may be limited by limiting the correction amount.

The present invention has been developed in view of the above-described circumstances, and the object of the present invention is to provide a safe electric power steering apparatus with a good steering feeling that includes a function for getting out from the restraint of the lateral flow or the one-sided flow, and enables acquisition of a better effect that the driver's load is reduced in the lateral flow or the one-sided flow.

Means for Solving the Problems

The present invention relates to an electric power steering apparatus that calculates a current command value of a motor which provides a steering mechanism with a steering assist torque based on a steering torque and a vehicle speed of a vehicle, and drives and controls said motor by feedback control, the above-described object of the present invention is achieved by that comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to at least said straight running judgment result SR, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; and wherein said adaptive calculating section resets said motor correction signal to zero by means of said steering angle and said action force when said vehicle departs from the straight running state, sets at least one threshold 1 smaller than a maximum correction value for said motor correction signal, sets an upper threshold 2 and a lower threshold 2' for a steering information of said steering mechanism, and gradually reduces said motor correction signal by using said motor correction signal, said threshold 1, said steering information, said threshold 2 and said threshold 2'.

Further, the above-described object of the present invention is more effectively achieved by an electric power steering apparatus that calculates a current command value of a motor which provides a steering mechanism with a steering assist torque based on a steering torque and a vehicle speed of a vehicle, and drives and controls said motor by feedback control, comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to the straight running judgment result SR from said straight running state judging section, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; and wherein said adaptive calculating section resets said motor correction signal to zero by means of said steering angle and said action force when said vehicle departs from the straight running state, sets upper and lower thresholds TA1 and TA2 smaller than a maximum correction value for said motor correction signal, stores said steering angle at the time when an absolute value of said motor correction signal exceeds said threshold TA1 as a steering angle 1, sets thresholds TA3 and TA4 up and down said steering angle 1, and gradually reduces said motor correction signal when said steering angle exceeds said threshold TA3 or TA4.

Further, the above-described object of the present invention is more effectively achieved by that wherein gradually reducing said motor correction signal is gradually reducing said motor correction signal towards zero; or wherein said thresholds TA1 and TA2 are larger than zero, and said thresholds TA3 and TA4 set an equal difference of a predetermined value SA for said steering angle 1; or which releases storing of said steering angle 1 and setting of said thresholds TA3 and TA4 when said motor correction signal becomes smaller than said threshold TA2 after gradually reducing said motor correction signal; or wherein said adaptive calculating section comprises a condition judging section 1 that outputs a judgment output CA1 based on a present value and a previous value of said motor correction signal, a condition judging section 2 that outputs judgment outputs CA4 and CA5 based on said straight running judgment result SR, said steering angle, said judgment output CA1, said motor correction signal and a judgment output CA2, a condition judging section 3 that outputs a judgment output CA3 based on said steering angle, said judgment outputs CA4 and CA5, and a logical outputting section that outputs a steering state signal by a logical product of said straight running judgment result SR and said judgment output CA3, inputs said judgment output CA5 into a memory unit, makes said judgment output CA5 into said judgment output CA2, and switches generation of said motor correction signal by said judgment output CA3; or wherein said condition judging section 1 outputs said judgment output CA1 by comparing the present value and the previous value of said motor correction signal with said threshold TA1; or wherein said condition judging section 2 outputs said judgment output CA4 made into 0, said steering angle or the previous sampling value and outputs said judgment output CA5 made into 0, 1 or the previous sampling value based on comparison with said threshold TA2, a state of said judgment output CA2, a state of said straight running judgment result SR and said judgment output CA1; or wherein said condition judging section 3 outputs said judgment output CA3 based on a state of said judgment output CA5 and a result caused by comparing said steering angle with said thresholds TA3 and TA4, or based on the state of said judgment output CA5 and a result caused by comparing a difference between said steering angle 1 and said steering angle with the predetermined value SA.

Further, the above-described object of the present invention is more effectively achieved by an electric power steering apparatus that calculates a current command value of a motor which provides a steering mechanism with a steering assist torque based on a steering torque and a vehicle speed of a vehicle, and drives and controls said motor by feedback control, comprising: a motor current correction value calculating section that judges a running state of said vehicle based on an action force added to the steering mechanism, a steering angle of said steering mechanism and said vehicle speed, and corrects said current command value by calculating a motor current correction value based on a judgment result of said running state, said action force and a predetermined condition; wherein said motor current correction value calculating section comprises a straight running state judging section that judges a straight running state of said vehicle and outputs a straight running judgment result SR, an adaptive calculating section that calculates and outputs a motor correction signal according to a steering angle velocity of said steering mechanism, said steering angle and said action force, a vehicle speed sensitive gain section that outputs a vehicle speed gain corresponding to said vehicle speed, and an output calculating section that multiplies said motor correction signal by said vehicle speed gain and outputs said motor current correction value; and wherein said adaptive calculating section resets said motor correction signal to zero by means of said steering angle and said action force when said vehicle departs from the straight running state, sets a threshold TB1 smaller than a maximum correction value for said motor correction signal, sets upper and lower thresholds TB2 and TB3 for said steering angle velocity, and gradually reduces said motor correction signal when an absolute value of said motor correction signal exceeds said threshold TB1 and said steering angle velocity exceeds said threshold TB2 or TB3.

Further, the above-described object of the present invention is more effectively achieved by that wherein gradually reducing said motor correction signal is gradually reducing said motor correction signal towards zero; or wherein said threshold TB1 is larger than zero, and said thresholds TB2 and TB3 set values of which each absolute value is a predetermined value SB and of which each sign is different; or wherein said adaptive calculating section comprises a condition judging section that outputs a judgment output CB based on said motor correction signal and said steering angle velocity, and a logical outputting section that outputs a steering state signal by a logical product of said straight running judgment result SR and said judgment output CB, and switches generation of said motor correction signal by said judgment output CB; or wherein said condition judging section outputs said judgment output CB based on a result caused by comparing said motor correction signal with said threshold TB1 and a result caused by comparing said steering angle velocity with said thresholds TB2 and TB3.

Effects of the Invention

The electric power steering apparatus of the present invention stores the steering angle at the time when the motor correction signal exceeds the threshold in the straight running state, and, at the same time, sets new thresholds up and down (±) its steering angle. Since then, the apparatus judges whether the steering angle exceeds the new thresholds, gradually reduces the motor correction signal towards zero when the steering angle exceeds the new thresholds, and releases (resets) the stored steering angle and the thresholds associated with it when the motor correction signal becomes smaller than the thresholds. Or the apparatus gradually reduces the motor correction signal towards zero when the motor correction signal exceeds the threshold in the straight running state and the steering angle velocity exceeds the thresholds.

Thus, it is possible to relax the limitation of the motor correction signal, get out from the lateral flow or the one-sided flow without giving the driver uncomfortable feeling, obtain the better effect that the driver's load is reduced in the lateral flow or the one-sided flow, and provide the safe electric power steering apparatus with the good steering feeling.

MODE FOR CARRYING OUT THE INVENTION

The present invention adds a function for getting out from restraint of a lateral flow or a one-sided flow by using steering information on a steering mechanism. The present invention uses a steering angle, a steering angle velocity or the like as the steering information.

Figure 5A:
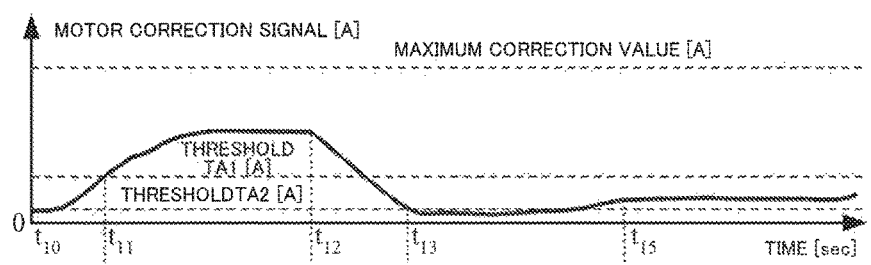
FIGS. 5A and 5B are time charts showing an operation principle of the present invention using a steering angle.
Figure 5B:
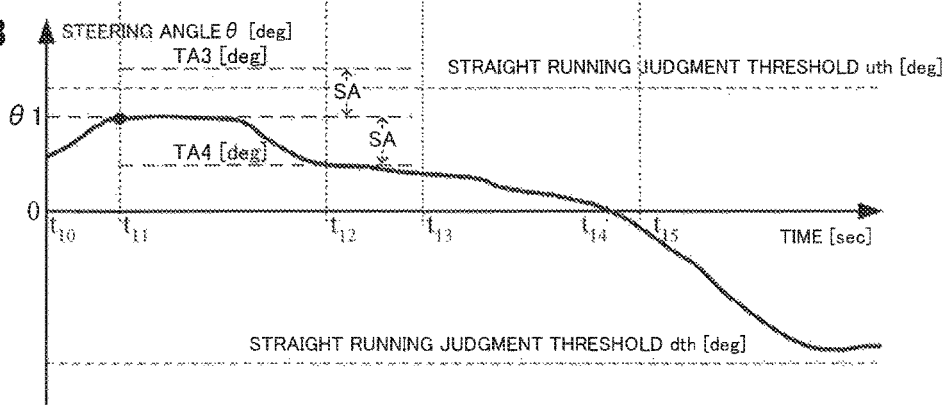

In the case of using the steering angle, thresholds TA1 and TA2 that are smaller than a maximum correction value are set for a motor correction signal, and straight running judgment thresholds uth and dth for judging straight running are set for a steering angle θ as shown in FIGS. 5A and 5B. When the motor correction signal exceeds the threshold TA1 in a state that the steering angle θ is between the straight running judgment thresholds uth and dth, in other words a state of straight running (a time point t11), the apparatus stores a steering angle θ1 at that time (the time point t11) to a memory, and, at the same time, sets new thresholds TA3 and TA4 up and down (±SA) the steering angle θ1. Since then, the apparatus judges whether the steering angle θ exceeds the new thresholds TA3 and TA4. The thresholds TA3 and TA4 have a width of the threshold SA for the stored steering angle θ1 respectively. In other words, TA3−θ1=SA and θ1−TA4=SA. Then, for example, the apparatus gradually reduces the motor correction signal towards zero when the steering angle θ becomes smaller than or equal to the new threshold TA4 at a time point t12 (when the apparatus determines that a driver has steered a vehicle deliberately). The apparatus releases (resets) the stored steering angle θ1 and the thresholds TA3 and TA4 associated with it when the motor correction signal becomes smaller than the threshold TA2 (a time point t13). Moreover, the motor correction signal changes because the judgment of straight running is established after the time point t13 (when the steering angle θ is between the straight running judgment thresholds uth and dth) in the example shown in FIGS. 5A and 5B.

Figure 6A:
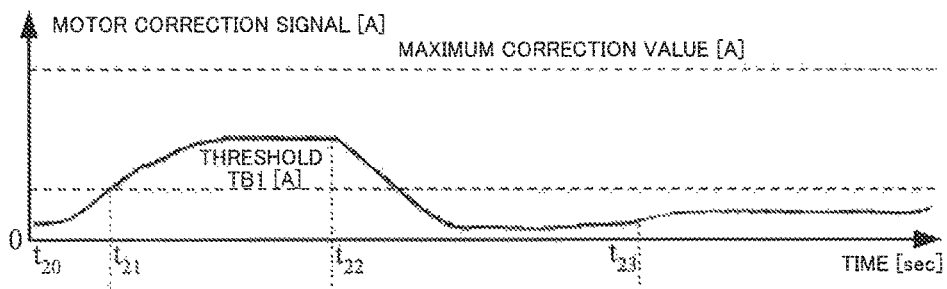
FIGS. 6A, 6B and 6C are time charts showing an operation principle of the present invention using a steering angle velocity.
Figure 6B:
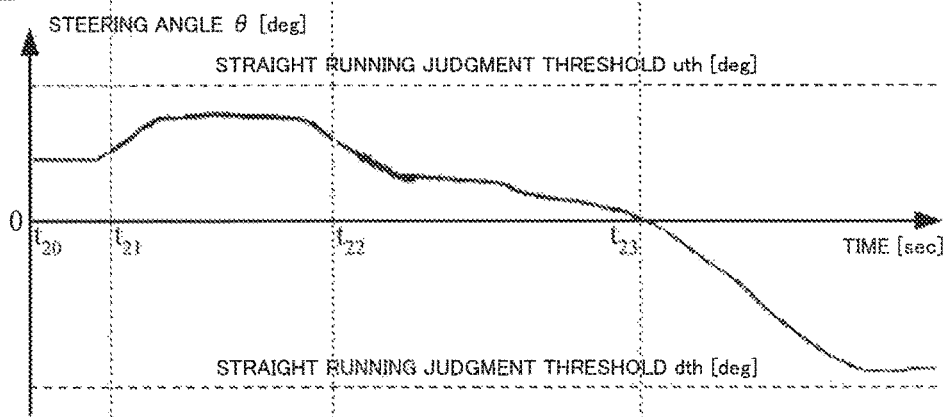
Figure 6C:
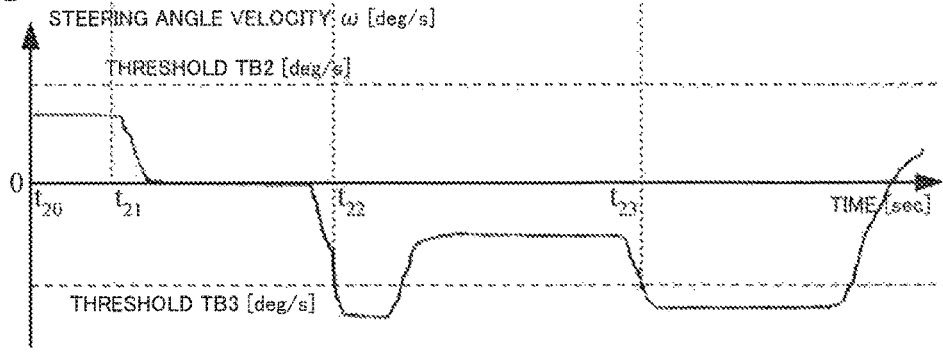

In the case of using the steering angle velocity, a threshold TB1 that is smaller than the maximum correction value is set for the motor correction signal, and the straight running judgment thresholds uth and dth for judging straight running are set for the steering angle θ as shown in FIGS. 6A and 6B. Furthermore, upper and lower thresholds TB2 and TB3 are set for a steering angle velocity ω as shown in FIG. 6C. The apparatus judges whether the motor correction signal becomes larger than or equal to the threshold TB1 and the steering angle velocity ω becomes larger than or equal to the threshold TB2 or becomes smaller than or equal to the threshold TB3 in the state that the steering angle θ is between the straight running judgment thresholds uth and dth, in other words the state of straight running. Moreover, an absolute value of the threshold TB2 and an absolute value of the threshold TB3 are the same predetermined value SB. Then, for example, the apparatus gradually reduces the motor correction signal towards zero when the motor correction signal becomes larger than or equal to the threshold TB1 at a time point t21 and furthermore the steering angle velocity ω becomes larger than or equal to the threshold TB3 at a time point t22 (when the apparatus determines that the driver has steered the vehicle deliberately). Moreover, the motor correction signal changes because the judgment of straight running is established after the time point t22 (when the steering angle θ is between the straight running judgment thresholds uth and dth) in the example shown in FIGS. 6A, 6B and 6C.

Thus, it is possible to get out from the restraint of the lateral flow or the one-sided flow without giving the driver uncomfortable feeling, relax the limitation of the motor correction signal, obtain the better effect that a driver's load is reduced in the lateral flow or the one-sided flow, and provide a safe electric power steering apparatus with good steering feeling.

Hereinafter, an embodiment of the present invention will be described in detail with reference to the accompanying drawings.

Figure 1:
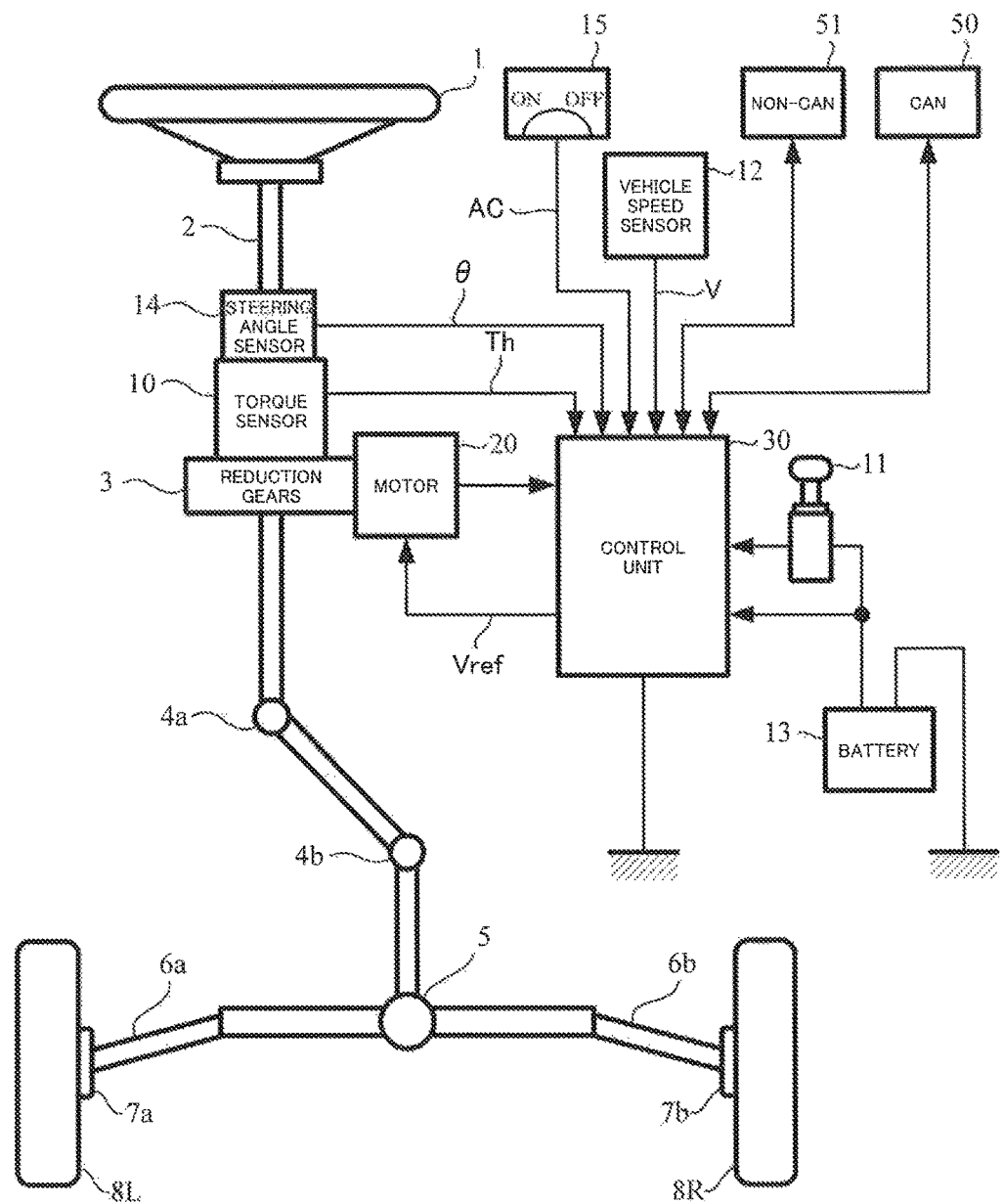
FIG. 1 is a configuration diagram illustrating a general outline of an electric power steering apparatus.
Figure 2:
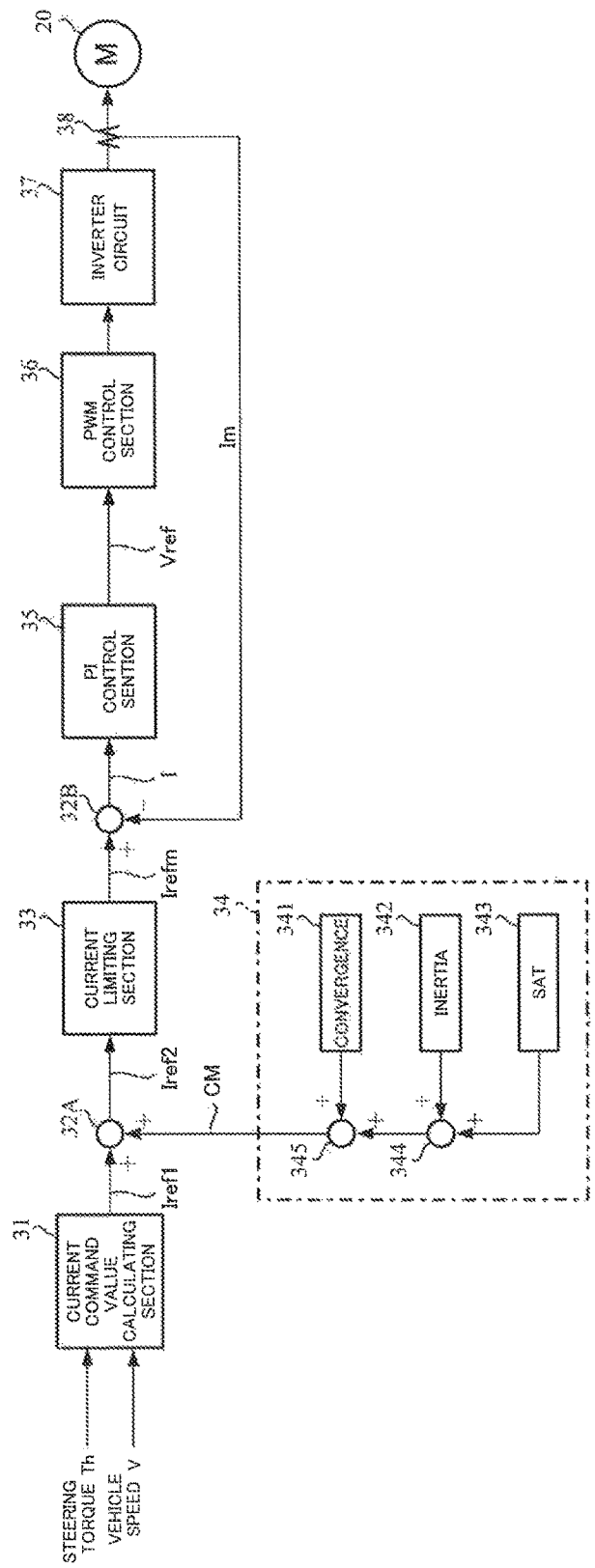
FIG. 2 is a block diagram showing a configuration example of a control unit (ECU) of the electric power steering apparatus.
Figure 3:
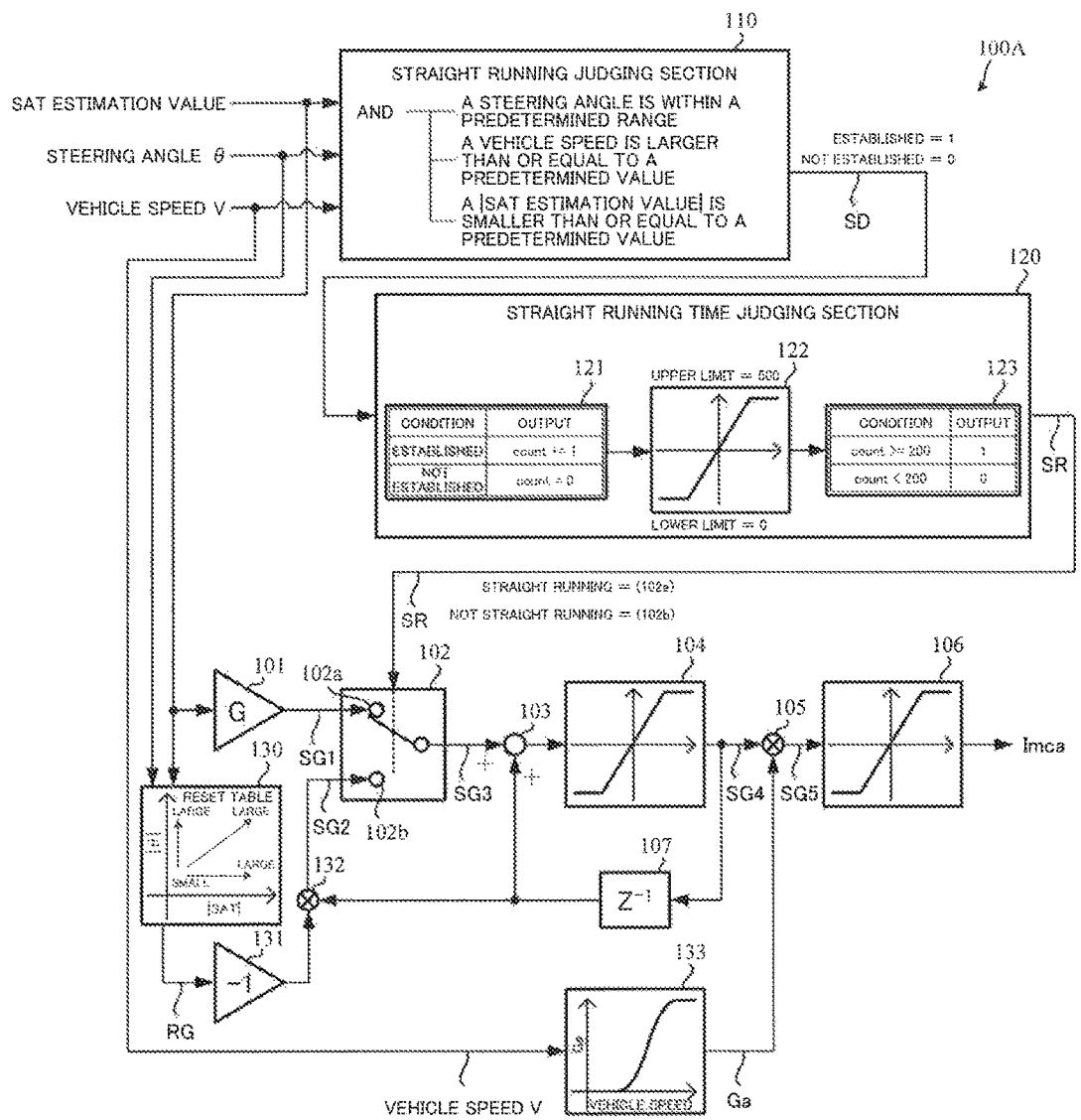
FIG. 3 is a block diagram showing a configuration example of a conventional correction apparatus.
Figure 4A:
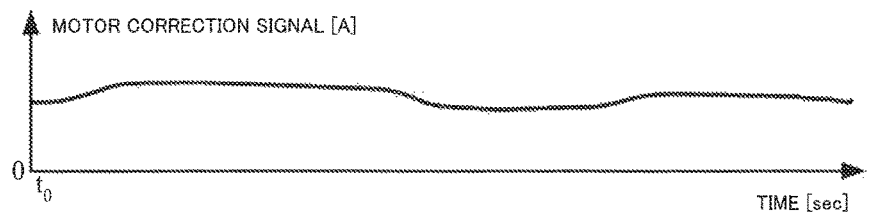
FIGS. 4A and 4B are characteristic diagrams showing a characteristic example of the conventional correction apparatus.
Figure 4B:
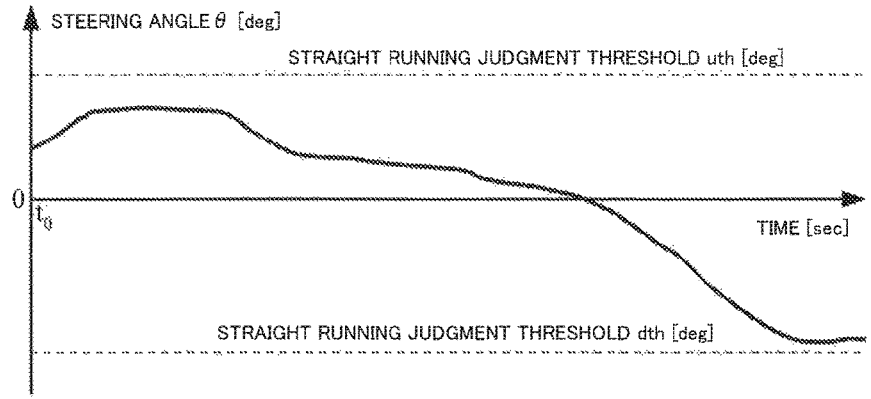
Figure 7:
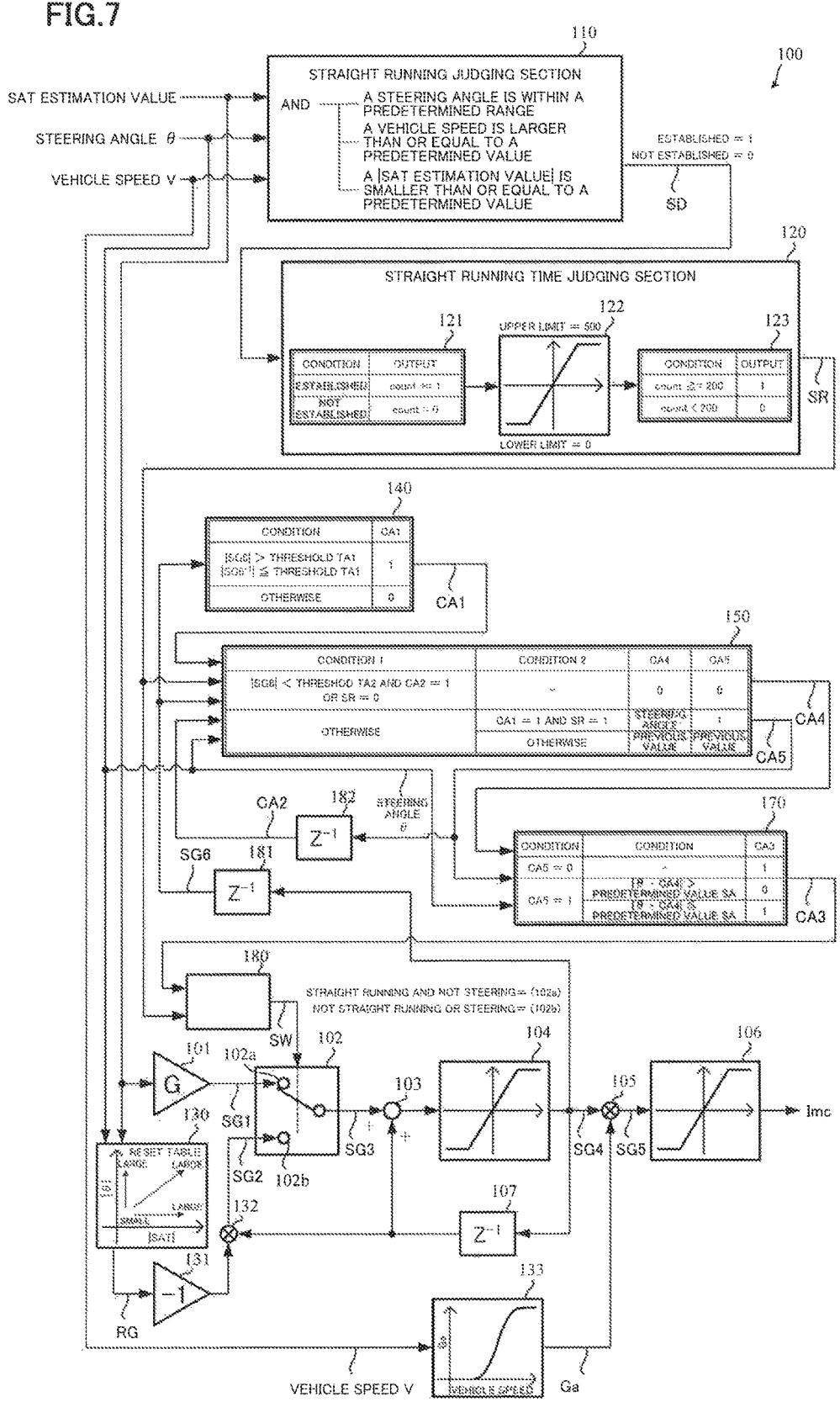
FIG. 7 is a block diagram showing a configuration example (a first embodiment) of the present invention.

FIG. 7 is a block diagram showing a configuration example (a first embodiment) of the present invention as corresponding to FIG. 3. A condition judging section 140 is provided that compares a motor correction signal SG6 being a present data from a memory unit 181, which has inputted a motor correction signal SG4 from a limiter 104, and a motor correction signal $SG6^{-1}$ (being a previous data) sampled before the last one with predetermined conditions, and outputs a judgment output CA1. The condition judging section 140 determines and outputs the judgment output CA1 according to the following Expression 1.

[Expression 1]

the judgment output $CA1=1$ when an absolute value of the present data>the threshold $TA1$ and an absolute value of the previous data≤the threshold $TA1$,   Condition A1:

the judgment output $CA1=0$, otherwise.   Condition B1:

The judgment output CA1 from the condition judging section 140 is inputted into a next section, a condition judging section 150. In addition, a straight running judgment result SR, the steering angle θ, an output SG6 from the memory unit 181 and a judgment output CA2 from a memory unit 182 are inputted into the condition judging section 150. Judgment outputs CA4 and CA5 being judgment results are outputted from the condition judging section 150. The condition judging section 150 judges according to the following Expression 2, and outputs the judgment outputs CA4 and CA5.

[Expression 2]

the judgment outputs $CA4=0$ and $CA5=0$ when an absolute value of $SG6<$the threshold $TA2$ and $CA2=1$, or $SR=0$,   Condition A2:

the judgment outputs $CA4=$the steering angle θ(the present one) and $CA5=1$ when the condition that the absolute value of $SG6<$the threshold $TA2$ and $CA2=1$, or $SR=0$ is not established, $CA1=1$ and $SR=1$,   Condition B2:

the judgment outputs $CA4=$the previous $CA4$ and $CA5=$the previous $CA5$ except that the absolute value of $SG6<$the threshold $TA2$ and $CA2=1$, or $SR=0$, and when the condition that $CA1=1$ and $SR=1$ is not established.   Condition C2:

The judgment outputs CA4 and CA5 from the condition judging section 150 are inputted into a condition judging section 170. In addition, the steering angle θ is inputted into the condition judging section 170, and a judgment output CA3 is outputted from the condition judging section 170. The condition judging section 170 judges according to the following Expression 3, and outputs the judgment output CA3.

[Expression 3]

$CA3=1$ when $CA5=0$,   Condition A3:

$CA3=0$ when $CA5=1$ and an absolute value of $(θ−CA4)>$the threshold $SA$,   Condition B3:

$CA3=1$ when $CA5=1$ and the absolute value of $(θ−CA4)≤$the threshold $SA$.   Condition C3:

The above conditions B3 and C3 may be the following because CA4=the steering angle θ1 in the case of CA5=1.

$CA3=0$ when $CA5=1$, and $θ>TA3$ or $θ<TA4$,   Condition B3:

$CA3=1$ when $CA5=1$, and $θ≤TA3$ and $θ≥TA4$.   Condition C3:

A straight running state judging section comprises a straight running judging section 110 and a straight running time judging section 120. An adaptive calculating section comprises the condition judging sections 140, 150 and 170, memory units 107, 181 and 182, a reset table 130, a sign inverting section 131, a gain section 101, a switching section 102, a logical outputting section 180, an adding section 103, a limiter 104, and a multiplying section 132. An output calculating section comprises a multiplying section 105 and a limiter 106. A motor current correction value calculating section for calculating and outputting a motor current correction value Imc comprises the straight running state judging section, the adaptive calculating section, a vehicle speed sensitive gain section 133 and the output calculating section.

Figure 8:
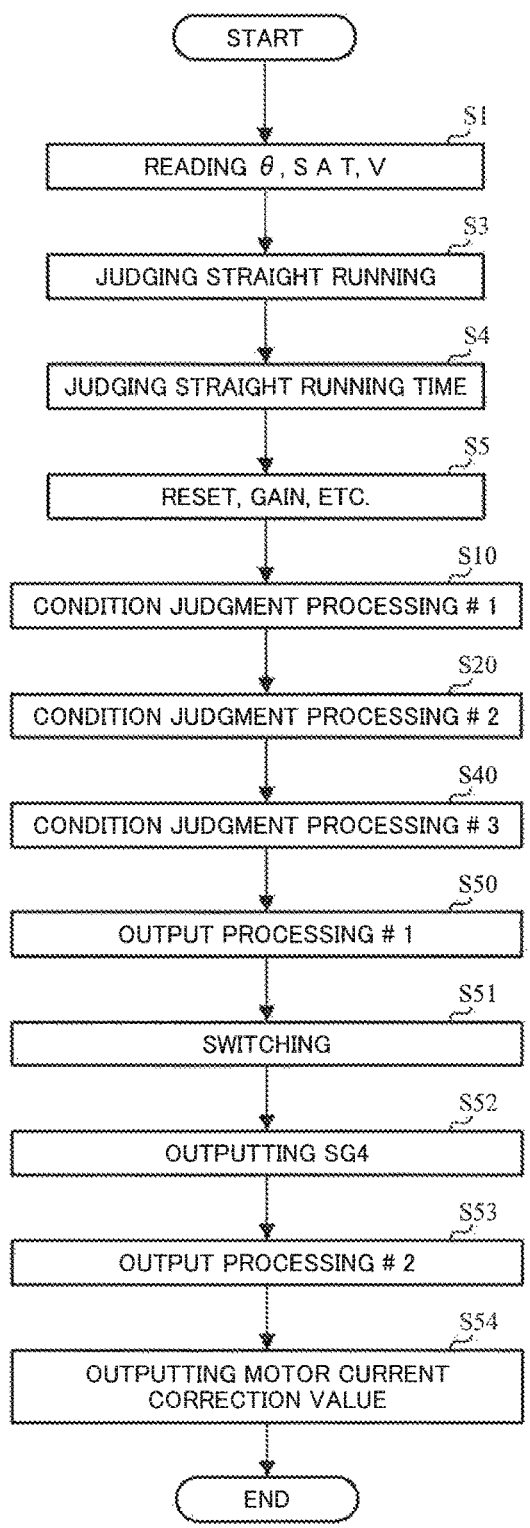
FIG. 8 is a flowchart showing an operating example (a first embodiment) of the present invention.

An operation example of such a configuration will be described with reference to a flowchart shown in FIG. 8.

First, the apparatus reads the steering angle θ, a SAT estimation value and a vehicle speed V (Step S1). Using them, the straight running judging section 110 judges straight running and outputs a judgment signal SD in the same way described in Patent Document 3 (Step S3). The judgment signal SD is inputted into the straight running time judging section 120, which judges the straight running time in the same way described in Patent Document 3 (Step S4). The straight running judgment result SR is inputted into the condition judging section 150 and the logical outputting section 180.

On the other hand, the SAT estimation value is inputted into the gain section 101 and the reset table 130, and the steering angle θ is inputted into the condition judging sections 150 and 170, and the reset table 130. In the same way as the above, a reset gain RG from the reset table 130 goes through the sign inverting section 131, is multiplied by the output of the memory unit 107 in a multiplying section 132, and is inputted into a contact 102b of the switching section 102. Further, the SAT estimation value is inputted into a contact 102a of the switching section 102 through the gain section 101 (Step S5). An output SG3 of the switching section 102 is outputted as the motor correction signal SG4 through the adding section 103 and the limiter 104. The motor correction signal SG4 is inputted into a multiplying section 105, and at the same time, has been inputted as the data SG6 into the condition judging section 140 through the memory unit 181.

The condition judging section 140 performs condition judgment processing #1 according to the above Expression 1 on the basis of the inputted data SG6 and the threshold TA1 (Step S10), and outputs the judgment output CA1. The judgment output CA1 is inputted into the condition judging section 150, which performs condition judgment processing #2 according to the above Expression 2 on the basis of the judgment output CA1, the straight running judgment result SR, the threshold TA2 and the like (Step S20), and outputs the judgment outputs CA4 and CA5. The judgment outputs CA4 and CA5 are inputted into the condition judging section 170, which performs condition judgment processing #3 according to the above Expression 3 on the basis of the judgment outputs CA4 and CA5, the steering angle θ, and the threshold SA or the thresholds TA3 and TA4 (Step S40), and outputs the judgment output CA3. Further, the judgment output CA5 has been inputted as the judgment output CA2 into the condition judging section 150 through the memory unit 182.

The judgment output CA3 is inputted into the logical outputting section 180, and output processing #1 with the straight running judgment result SR and CA3 is performed in the logical outputting section 180 (Step S50). A steering state signal SW from the logical outputting section 180 switches the switching section 102 to the contact 102a in the case of straight running and not steering, and switches the switching section 102 to the contact 102b in the case of not straight running or steering (Step S51).

The adding section 103 adds an output signal from the memory unit 107 to a signal SG3 being an output from the switching section 102, the limiter 104 makes the addition result the motor correction signal SG4, and the motor correction signal SG4 is inputted into the condition judging sections 140 and 150 through the memory unit 181 (Step S52). Further, the motor correction signal SG4, to which output processing #2 is performed by the multiplying section 105 and the limiter 106 as the output calculating section (Step S53), is outputted as the motor current correction value Imc (Step S54). The motor current correction value Imc corrects a current command value.

Figure 9A:
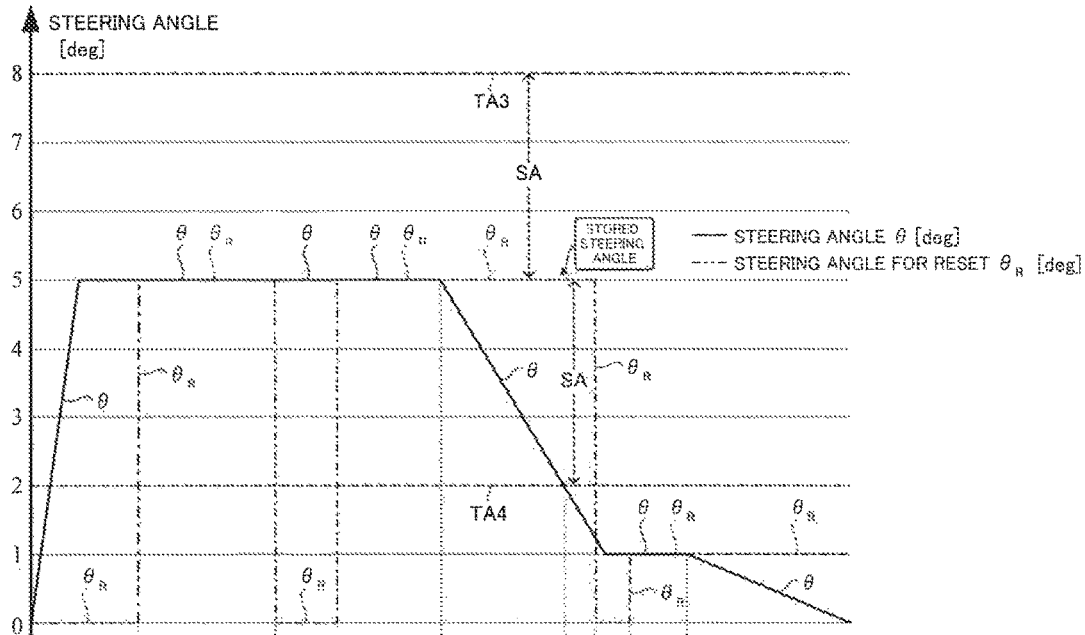
FIGS. 9A, 9B and 9C are time charts showing an operating example (a result of a simulation) of the present invention.
Figure 9B:
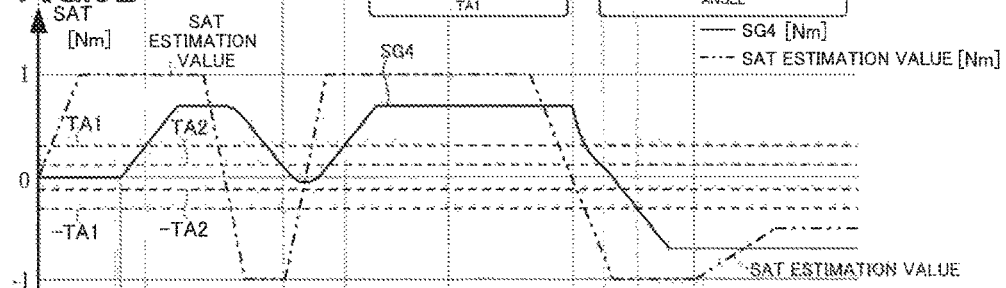
Figure 9C:
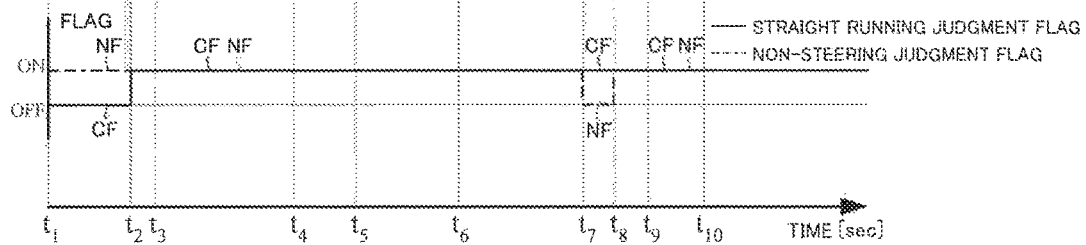

FIGS. 9A, 9B and 9C show a simulation result, FIG. 9A shows a change of the steering angle θ and a stored steering angle $\theta_R$, FIG. 9B shows the SAT estimation value and the restraint (the correction value) of the lateral flow or the one-sided flow, and FIG. 9C shows ON/OFF states of a straight running judgment flag CF and non-steering judgment flag NF.

The straight running judgment flag CF is ON after a time point t2. The non-steering judgment flag NF is ON between time points t1-t7, becomes OFF between time points t7-t8, and becomes ON after the time point t8. Since the motor correction signal (SG4) exceeds the threshold TA1 at a time point t3 and a time point t5, the apparatus stores the steering angles θ (stored values $\theta_R$) at those times. Further, since the steering angle θ becomes smaller than the threshold TA4 (=$\theta_R$−SA), reset processing begins at this time point t7.

Next, another embodiment of the present invention will be described.

Figure 10:
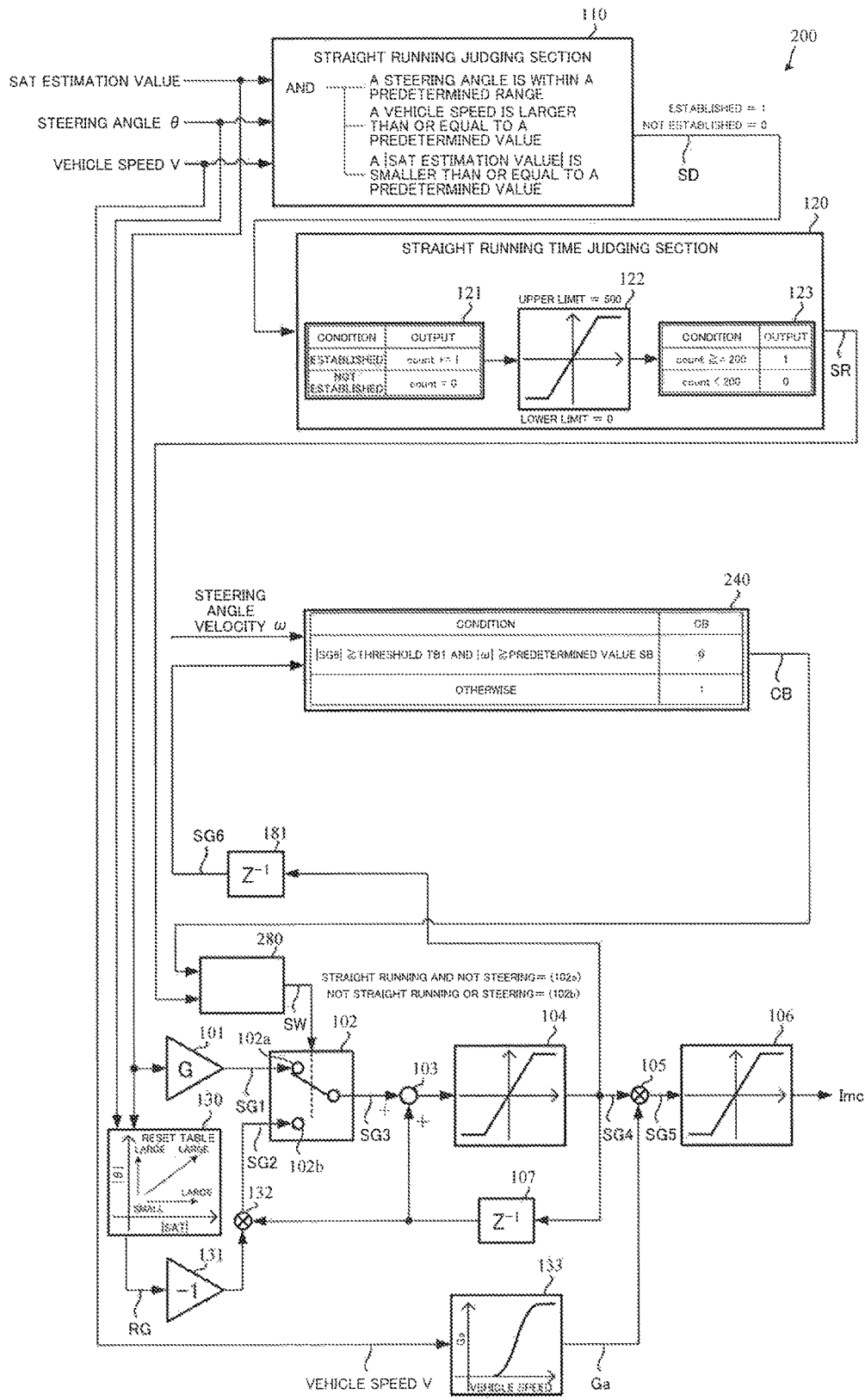
FIG. 10 is a block diagram showing a configuration example (a second embodiment) of the present invention.

FIG. 10 is a block diagram showing a configuration example (a second embodiment) of the present invention as corresponding to FIG. 3. A condition judging section 240 is provided that inputs the motor correction signal SG6 from the memory unit 181, which has inputted the motor correction signal SG4 from the limiter 104, and the steering angle velocity ω, and outputs a judgment output CB. The condition judging section 240 determines and outputs the judgment output CB according to the following Expression 4.

[Expression 4]

the judgment output $CB=0$ when the absolute value
of $SG6 \geq$ the threshold $TB1$ and an absolute
value of $\omega \geq$ the predetermined value $SB$,     Condition A4:

the judgment output $CB=1$, otherwise.     Condition B4:

The above condition A4 may be the following because the predetermined value SB is the same value as absolute values of the threshold TB2 and the threshold TB3.

the judgment output $CB=0$ when the absolute value
of $SG6 \geq$ the threshold $TB1$, and $\omega \geq$ the threshold
$TB2$ or $\omega \leq$ the threshold $TB3$.     Condition A4:

The straight running state judging section comprises the straight running judging section 110 and the straight running time judging section 120. The adaptive calculating section comprises the condition judging sections 240, the memory units 107 and 181, the reset table 130, the sign inverting section 131, a multiplying section 132, the gain section 101, the switching section 102, a logical outputting section 280, the adding section 103, and the limiter 104. The output calculating section comprises the multiplying section 105 and the limiter 106. The motor current correction value calculating section for calculating and outputting the motor current correction value Imc comprises the straight running state judging section, the adaptive calculating section, the vehicle speed sensitive gain section 133 and the output calculating section.

Figure 11:
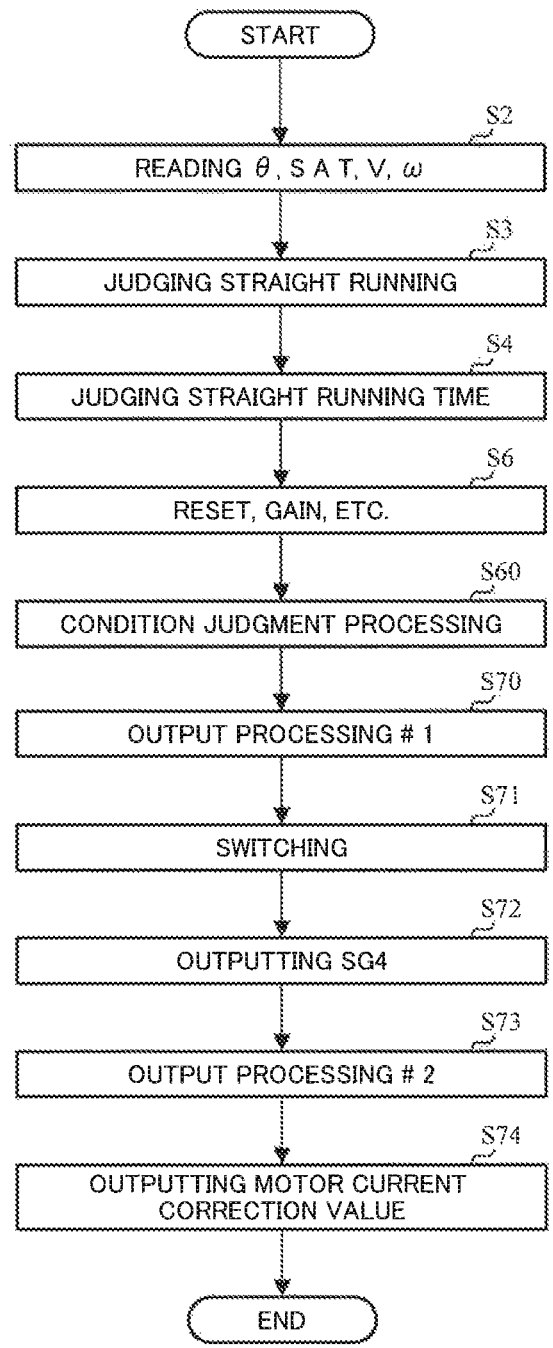
FIG. 11 is a flowchart showing an operating example (a second embodiment) of the present invention.

An operation example of such a configuration will be described with reference to a flowchart shown in FIG. 11.

First, the apparatus reads the steering angle θ, the SAT estimation value, the vehicle speed V and the steering angle velocity ω (Step S2). The straight running judging section 110 judges straight running and outputs the judgment signal SD on the basis of the steering angle θ, the SAT estimation value and the vehicle speed V in the same way described in Patent Document 3 (Step S3). The judgment signal SD is inputted into the straight running time judging section 120, which judges the straight running time in the same way described in Patent Document 3 (Step S4). The straight running judgment result SR is inputted into the logical outputting section 280.

On the other hand, the SAT estimation value is inputted into the gain section 101 and the reset table 130, and the steering angle θ is inputted into the reset table 130. In the same way as the above, the reset gain RG from the reset table 130 goes through the sign inverting section 131, is multiplied by the output of the memory unit 107 in the multiplying section 132, and is inputted into the contact 102b of the switching section 102. Further, the SAT estimation value is inputted into the contact 102a of the switching section 102 through the gain section 101 (Step S6). The output SG3 of the switching section 102 is outputted as the motor correction signal SG4 through the adding section 103 and the limiter 104. The motor correction signal SG4 is inputted into the multiplying section 105, and at the same time, is inputted as the data SG6 into the condition judging section 240 through the memory unit 181.

The condition judging section 240 performs condition judgment processing according to the above Expression 4 on the basis of the inputted data SG6, the steering angle velocity ω, the threshold TB1, and the predetermined value SB or the thresholds TB2 and TB3 (Step S60), and outputs the judgment output CB.

The judgment output CB is inputted into the logical outputting section 280, and output processing #1 with the straight running judgment result SR and CB is performed in the logical outputting section 280 (Step S70). The steering state signal SW from the logical outputting section 280 switches the switching section 102 to the contact 102a in the case of straight running and not steering, and switches the switching section 102 to the contact 102b in the case of not straight running or steering (Step S71).

The adding section 103 adds the output signal from the memory unit 107 to the signal SG3 being the output from the switching section 102, the limiter 104 makes the addition result the motor correction signal SG4, and the motor correction signal SG4 is inputted into the condition judging section 240 through the memory unit 181 (Step S72). Further, the motor correction signal SG4, to which output processing #2 is performed by the multiplying section 105 and the limiter 106 as the output calculating section (Step S73), is outputted as the motor current correction value Imc (Step S74). The motor current correction value Imc corrects the current command value.

Moreover, the above-mentioned is described using the SAT estimation value as an action force added to a steering mechanism, which may be a value detected by a sensor. Further, the above calculates absolute values of signals and detected values, and compares them with thresholds. However, the same comparison operation is possible without calculating the absolute values if the threshold has positive and negative values.

EXPLANATION OF REFERENCE NUMERALS

1 steering wheel
2 column shaft (steering shaft, handle shaft)
10 torque sensor
12 vehicle speed sensor
14 steering angle sensor
15 auto-cruise switch
20 motor
30 control unit (ECU)
31 current command value calculating section
35 PI control section
36 PWM control section
37 inverter circuit
100A, 100, 200 motor current correction value calculating section
110 straight running judging section
120 straight running time judging section
130 reset table
133 vehicle speed sensitive gain section
140, 150, 170, 240 condition judging section

The invention claimed is:

1. A control unit that calculates a current command value of a motor which provides a steering mechanism with a steering assist torque based on a steering torque and a vehicle speed of a vehicle, and drives and controls said motor by feedback control, comprising:
a processor that is configured to perform functions that require said control unit to judge a running state of said vehicle based on an action force added to said steering mechanism, a steering angle of said steering mechanism and said vehicle speed, and correct said current command value by calculating a motor current correction value based on a judgment result of said running state and said action force,
wherein said processor is configured to execute a plurality of software sections comprising:
a straight running state judging section that judges a straight running state of said vehicle to obtain a straight running judgment result (SR),
an adaptive calculating section that calculates a motor correction signal based on at least said straight running judgment result (SR), said steering angle, and said action force,
a vehicle speed sensitive gain section that obtains a vehicle speed gain corresponding to said vehicle speed, and
an output calculating section that multiplies said motor correction signal by said vehicle speed gain to obtain said motor current correction value,
wherein said adaptive calculating section resets said motor correction signal to zero based on said steering angle and said action force when said vehicle departs from said straight running state, sets at least one first threshold smaller than a maximum correction value for said motor correction signal, sets a second upper threshold for a steering information of said steering mechanism and a third lower threshold for said steering information, and in said straight running state of said vehicle, gradually reduces said motor correction signal by using said motor correction signal, said at least one first threshold, said steering information, said second upper threshold and said third lower threshold when judging that a driver steers in said straight running state of said vehicle, and wherein said control unit corrects said current command value by said motor current correction value.

2. A control unit (ECU) that calculates a current command value of a motor which provides a steering mechanism with a steering assist torque based on a steering torque and a vehicle speed of a vehicle, and drives and controls said motor by feedback control, comprising:

a processor that is configured to perform functions that require said control unit to judge a running state of said vehicle based on an action force added to said steering mechanism, a steering angle of said steering mechanism and said vehicle speed, and correct said current command value by calculating a motor current correction value based on a judgment result of said running state and said action force, wherein said processor is configured to execute a plurality of software sections comprising:

a straight running state judging section that judges a straight running state of said vehicle to obtain a straight running judgment result (SR), an adaptive calculating section that calculates a motor correction signal based on at least said straight running judgment result (SR), said steering angle, and said action force, a vehicle speed sensitive gain section that obtains a vehicle speed gain corresponding to said vehicle speed, and an output calculating section that multiplies said motor correction signal by said vehicle speed gain to obtain said motor current correction value, wherein said adaptive calculating section resets said motor correction signal to zero in accordance with said steering angle and said action force when said vehicle departs from said straight running state, sets an upper first threshold (TA1) and a lower second threshold (TA2) that are smaller than a maximum correction value for said motor correction signal, controls a memory to store said steering angle at a time when an absolute value of said motor correction signal exceeds said upper first threshold (TA1) as a first steering angle, sets a third threshold (TA3) larger than said first steering angle and a fourth threshold (TA4) smaller than said first steering angle, and gradually reduces said motor correction signal when said steering angle is out of a range between said third threshold (TA3) and said fourth threshold (TA4), and wherein said control unit corrects said current command value of said motor by said motor current correction value.

3. The ECU according to claim 2, wherein gradually reducing said motor correction signal is gradually reducing said motor correction signal towards zero.

4. The ECU according to claim 2, wherein said upper first threshold (TA1) and said lower second threshold (TA2) are larger than zero, and wherein said third threshold (TA3) minus said first steering angle equals a predetermined value (SA) and said first steering angle minus said fourth threshold (TA4) equals said predetermined value (SA).

5. The ECU according to claim 2, which releases storing of said first steering angle and setting of said third threshold (TA3) and said fourth threshold (TA4) when said motor correction signal becomes smaller than said lower second threshold (TA2) after gradually reducing said motor correction signal.

6. The ECU according to claim 2, wherein said processor obtains a first judgment output (CA1) based on a present value and a previous value of said motor correction signal, obtains a fourth judgment output (CA4) and a fifth judgment output (CA5) based on said straight running judgment result (SR), said steering angle, said first judgment output (CA1), said motor correction signal and a second judgment output (CA2), obtains a third judgment output (CA3) based on said steering angle, said fourth judgment output (CA4) and said fifth judgment output (CA5), and obtains a steering state signal by a logical product of said straight running judgment result (SR) and said third judgment output (CA3), inputs said fifth judgment output (CA5) into said memory, stores said fifth judgment output (CA5) as said second judgment output (CA2), and wherein said ECU switches generation of said motor correction signal to be provided to said motor by said third judgment output (CA3).

7. The ECU according to claim 6, wherein said ECU outputs said first judgment output (CA1) by comparing said present value and said previous value of said motor correction signal with said upper first threshold (TA1).

8. The ECU according to claim 6, wherein said processor obtains said fourth judgment output (CA4) equal to 0, said steering angle or said previous value and obtains said fifth judgment output (CA5) equal to 0, 1 or said previous value based on comparison with said lower second threshold (TA2), a state of said second judgment output (CA2), a state of said straight running judgment result (SR) and said first judgment output (CA1).

9. The ECU according to claim 7, wherein said processor obtains said fourth judgment output (CA4) equal to 0, said steering angle or said previous value and outputs said fifth judgment output (CA5) equal to 0, 1 or said previous value based on comparison with said lower second threshold (TA2), a state of said second judgment output (CA2), a state of said straight running judgment result (SR) and said first judgment output (CA1).

10. The ECU according to claim 6, wherein said processor obtains said third judgment output (CA3) based on a state of said fifth judgment output (CA5) and a result caused by comparing said steering angle with said third threshold (TA3) and said fourth threshold (TA4), or based on said state of said fifth judgment output (CA5) and a result caused by comparing a difference between said first steering angle and said steering angle with a predetermined value (SA).

11. The ECU according to claim 7, wherein said processor obtains said third judgment output (CA3) based on a state of said fifth judgment output (CA5) and a result caused by comparing said steering angle with said third threshold (TA3) and said fourth threshold (TA4), or based on said state of said fifth judgment output (CA5) and a result caused by comparing a difference between said first steering angle and said steering angle with a predetermined value (SA).

12. The ECU according to claim 8, wherein said processor obtains said third judgment output (CA3) based on a state of said fifth judgment output (CA5) and a result caused by comparing said steering angle with said third threshold (TA3) and said fourth threshold (TA4), or based on said state of said fifth judgment output (CA5) and a result caused by comparing a difference between said first steering angle and said steering angle with a predetermined value (SA).

13. The ECU according to claim 9, wherein said processor obtains said third judgment output (CA3) based on a state of said fifth judgment output (CA5) and a result caused by comparing said steering angle with said third threshold (TA3) and said fourth threshold (TA4), or based on said state of said fifth judgment output (CA5) and a result caused by comparing a difference between said first steering angle and said steering angle with a predetermined value (SA).

14. A control unit (ECU) that calculates a current command value of a motor which provides a steering mechanism with a steering assist torque based on a steering torque and a vehicle speed of a vehicle, and drives and controls said motor by feedback control, comprising:
a processor that is configured to perform functions that require said control unit to judge a running state of said vehicle based on an action force added to said steering mechanism, a steering angle of said steering mechanism and said vehicle speed, and correct said current command value by calculating a motor current correction value based on a judgment result of said running state and said action force,
wherein said processor is configured to execute a plurality of software sections comprising:
a straight running state judging section that judges a straight running state of said vehicle to obtain a straight running judgment result (SR),
an adaptive calculating section that calculates a motor correction signal based on at least said straight running judgment result (SR), said steering angle, and said action force,
a vehicle speed sensitive gain section that obtains a vehicle speed gain corresponding to said vehicle speed, and
an output calculating section that multiplies said motor correction signal by said vehicle speed gain to obtain said motor current correction value,
wherein said adaptive calculating section resets said motor correction signal to zero in accordance with said steering angle and said action force when said vehicle departs from said straight running state, sets a first threshold (TB1) smaller than a maximum correction value for said motor correction signal, sets an upper second threshold (TB2) and a lower third threshold (TB3) for a steering angle velocity of said steering mechanism, and gradually reduces said motor correction signal when an absolute value of said motor correction signal exceeds said first threshold (TB1) and said steering angle velocity is out of a range between said upper second threshold (TB2) and said lower third threshold (TB3), and
wherein said control unit corrects said current command value of said motor by said motor current correction value.

15. The ECU according to claim 14, wherein gradually reducing said motor correction signal is gradually reducing said motor correction signal towards zero.

16. The ECU according to claim 14, wherein said first threshold (TB1) is larger than zero, and said upper second threshold (TB2) and said lower third threshold (TB3) set values of which each absolute value is a predetermined value (SB) and of which each sign is different.

17. The ECU according to claim 14, wherein said ECU obtains a judgment output (CB) based on said motor correction signal and said steering angle velocity, and obtains a steering state signal by a logical product of said straight running judgment result (SR) and said judgment output (CB), and switches generation of said motor correction signal by said obtained judgment output (CB).

18. The ECU according to claim 17, wherein said ECU obtains said judgment output (CB) based on a result caused by comparing said motor correction signal with said first threshold (TB1) and a result caused by comparing said steering angle velocity with said upper second threshold (TB2) and said lower third threshold (TB3).

19. A method, executed in an electronic control unit (ECU), for controlling an electric power steering apparatus comprising:
calculating a current command value based on a steering torque and a vehicle speed of a vehicle;
judging a running state of said vehicle based on an action force added to a steering mechanism, a steering angle of said steering mechanism and said vehicle speed;
calculating a motor current correction value based on a judgment result of said running state and said action force; and
correcting said current command value by said calculated motor current correction value; and
outputting, by said ECU to a motor that provides a steering assist torque to said steering mechanism, said corrected current command value, wherein said ECU drives and controls said motor via a feedback control,
wherein said calculating of said motor current correction value comprises:
judging a straight running state of said vehicle to obtain a straight running judgment result (SR),
calculating a motor correction signal based on at least said straight running judgment result (SR), said steering angle, and said action force,
obtaining a vehicle speed gain corresponding to said vehicle speed, and
multiplying said motor correction signal by said vehicle speed gain to obtain said motor current correction value,
wherein said motor correction signal is reset to zero in accordance with said steering angle and said action force when said vehicle departs from said straight running state,
wherein at least one first threshold is set to be smaller than a maximum correction value for said motor correction signal,
wherein a second upper threshold and a third lower threshold are set for a steering information of said steering mechanism,
wherein, in said straight running state of said vehicle, gradually reducing said motor correction signal by using said motor correction signal, said at least one first threshold, said steering information, said second upper threshold for said steering information of said steering mechanism, and said third lower threshold for said steering information of said steering mechanism, when judging that a driver steers said vehicle in said straight running state, and
wherein the said steering information of said steering mechanism comprises said steering angle or a steering angle velocity.

20. A non-transitory computer readable medium storing instructions for controlling an electric power steering apparatus, which when executed by an electronic control unit (ECU) cause said ECU to execute the following operations comprising:
calculating a current command value based on a steering torque and a vehicle speed of a vehicle;
judging a running state of said vehicle based on an action force added to a steering mechanism, a steering angle of said steering mechanism and said vehicle speed;
calculating a motor current correction value based on a judgment result of said running state and said action force;

correcting said current command value by said calculated motor current correction value; and outputting said corrected current command value to a motor that provides said steering mechanism with a steering assist torque, wherein said calculating of said motor current correction value comprises:

judging a straight running state of said vehicle to obtain a straight running judgment result (SR), calculating a motor correction signal according to at least said straight running judgment result (SR), said steering angle, and said action force, obtaining a vehicle speed gain corresponding to said vehicle speed, and multiplying said motor correction signal by said vehicle speed gain to obtain said motor current correction value, wherein said motor correction signal is reset to zero in accordance with said steering angle and said action force when said vehicle departs from said straight running state, wherein at least one first threshold smaller than a maximum correction value for said motor correction signal is set, wherein a second upper threshold and a third lower threshold are set for a steering information of said steering mechanism, wherein, in said straight running state of said vehicle, gradually reducing said motor correction signal by using said motor correction signal, said at least one first threshold, said steering information, said second upper threshold for said steering information of said steering mechanism, and said third lower threshold for said steering information of said steering mechanism, when judging that a driver steers said vehicle in said straight running state, and wherein said steering information comprises said steering angle or a steering angle velocity.

* * * * *